(12) United States Patent
Roessler

(10) Patent No.: US 6,588,576 B1
(45) Date of Patent: Jul. 8, 2003

(54) METHODS OF AND DEVICE FOR FEEDING FASTENING ELEMENTS

(75) Inventor: Andreas Roessler, Fernwald (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/255,819

(22) Filed: Sep. 26, 2002

Related U.S. Application Data

(63) Continuation-in-part of application No. 09/592,394, filed on Jun. 13, 2000, now abandoned.

(30) Foreign Application Priority Data

Jun. 14, 1999  (DE) .......................................... 199 26 947

(51) Int. Cl.[7] .............................................. B65G 47/24
(52) U.S. Cl. ...................... 198/389; 198/374; 198/438; 198/463.4; 406/72; 406/76; 406/148
(58) Field of Search .............................. 406/72, 76, 148, 406/149, 374, 389, 438, 197; 198/463.4; 227/112

(56) References Cited

U.S. PATENT DOCUMENTS

| | | | | |
|---|---|---|---|---|
| 3,731,783 A | * | 5/1973 | Dreher et al. ........... 198/31 AA |
| 3,759,418 A | * | 9/1973 | Willson et al. .............. 221/157 |
| 4,082,366 A | * | 4/1978 | Duff et al. ..................... 302/11 |
| 4,182,030 A | * | 1/1980 | Mullins ........................ 29/753 |
| 5,779,127 A | * | 7/1998 | Blacket et al. .............. 227/109 |
| 5,964,393 A | * | 10/1999 | Feldpausch et al. ........ 227/135 |

* cited by examiner

Primary Examiner—Joseph A. Dillon
(74) Attorney, Agent, or Firm—Edward D. Murphy

(57) ABSTRACT

A fastening element 30 is fed from a feed track 64 through a feed chamber, formed by interfacing closed channels 132 and 160, to a junction point located in a feed passage 84, formed by two communicating feed openings 86 and 88. An inclined surface 82, located between the feed chamber and the junction point, is inclined downward from the feed chamber to the junction point. A ram 105, located movably in the feed chamber, transfers the fastening element 30 from the feed track 64 to the inclined surface 82, where the fastening element moves down the inclined surface to the junction point. Upon the application of a pressure medium into the feed passage 84, selectively in either of two directions, the fastening element 30 can be directed toward a fastening device 104.

14 Claims, 8 Drawing Sheets

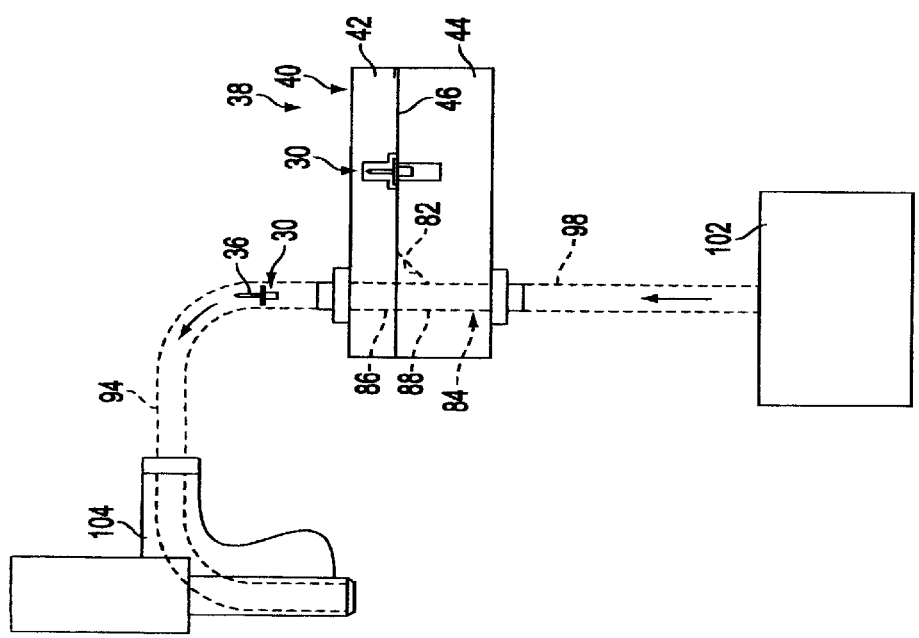
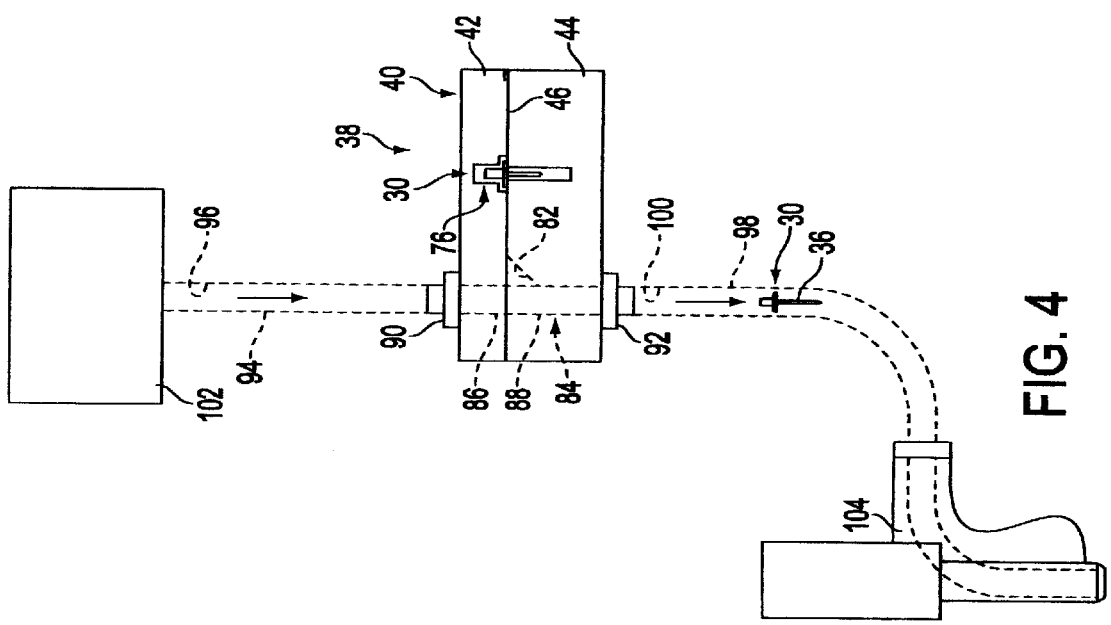
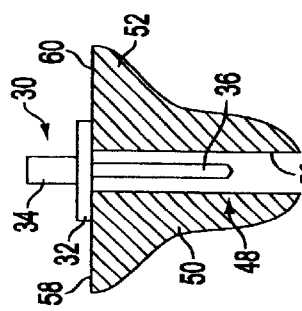
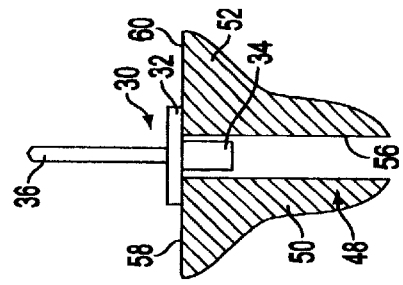

METHODS OF AND DEVICE FOR FEEDING FASTENING ELEMENTS

This application is a continuation-in-part of applicant's U.S. application Ser. No. 09/592,394, filed Jun. 13, 2000, and titled METHODS OF AND DEVICE FOR FEEDING FASTENING ELEMENTS, which is now abandoned. The disclosure of applicant's above-noted application is hereby incorporated herein by reference thereto.

BACKGROUND OF THE INVENTION

This invention relates to methods of and a device for feeding fastening elements, and particularly relates to methods of and a device for feeding rivets from a supply location to a junction location.

In the course of rising automation in manufacturing procedures, devices have been developed by which fastening elements are automatically assembled with at least one structure. Such fastening elements are designed preferably asymmetrically with respect to a central plane, and can be, for example, rivets, screws, nails or the like.

Known methods, and related devices, for feeding such fastening elements successively are described and illustrated in U.S. Pat. Nos. 5,779,127 and 5,964,393, where each fastening element is formed with a shaft and a head. Each fastening element can be fed in a single direction, and in a single orientation, to a position where a hammer or a punch of a fastening machine is axially aligned with, and facing, the head of the positioned fastening element. When the fastening machine is operated, the hammer is moved toward and engages the head of the fastening element, to move the element in such a direction that a free end of the shaft becomes the forward or front end of the moving fastening element, and a free end of the head becomes the trailing end of the fastening element.

Fastening machines, such as those described and illustrated in U.S. Pat. Nos. 5,964,393 and 5,779,127, include feed devices which are designed for feeding each fastening element to the fastening machine at the same orientation where, for example, the head of the fastening element is always positioned for ultimate engagement with the hammer or the punch. Feed devices of this type provide for the placement of the fastening device in a single orientation only, immediately prior to assembly of the fastening element with the structure. Such feed devices do not provide facility for selectively positioning the fastening element in either of two orientations in preparation for assembly of the fastening with the structure.

Thus, there is a need for methods of and a device for feeding successive fastening elements into position so that the fastening elements can be selectively fed in either of two orientations for subsequent assembly with a structure.

Further, there is a need for methods of and a device for feeding successive fastening elements of different structure into a position so that the fastening elements can be selectively fed in either of two orientations, depending on the structure of each element, for subsequent assembly of each element with an associated structure.

SUMMARY OF THE INVENTION

It is, therefore, an object of this invention to provide methods of feeding fastening elements into a position for ultimate feeding of the elements so that the elements can be positioned in either of two orientations.

Another object of this invention to provide a device for feeding fastening elements into a position for ultimate feeding of the elements so that the elements can be positioned in either of two orientations.

Still another object of this invention is to provide a method and a device for feeding a fastening element of a first design, and a fastening element of a second design different from the first design, into a location from which each of the fastening elements can be selectively moved to a respective one of two orientations.

With these and other objects in mind, this invention contemplates a method for feeding a fastening element, formed with a first end and a second end. The method includes the steps of transporting the fastening element from a feed track to a junction point within a feed passage formed by a first feed opening and a second feed opening which is in communication with the first feed opening. The fastening element is arranged in a given orientation at the junction point such that the first end of the fastening element is a front end thereof when the fastening element is to be moved through the first feed opening and the second end of the fastening element is a front end thereof when the fastening element is to be moved through the second feed opening.

This invention further contemplates a device for feeding a fastening element, formed with a first end and a second end, toward a downstream point, and includes a feed track, a first feed opening, and a second feed opening in communication with the first feed opening. The first feed opening and the second feed opening form a feed passage, with a junction point located within the feed passage. Each of the first and second feed openings extend toward a downstream point. Means are provided for transporting the fastening element from the feed track toward the junction point. Further, means are provided for arranging the fastening element in a given orientation at the junction point such that the first end of the fastening element is a front end thereof when the fastening element is to be moved through the first feed opening and the second end of the fastening element is a front end thereof when the fastening element is to be moved through the second feed opening.

Still further, this invention contemplates the feeding of fastening elements having a first end and a second end, which could be rivets, preferably blind rivets, to a fastening device. A method according to the present invention provides that at least one fastening element is transported to a junction point at a given orientation through and from a feed track. The fastening element preferably is moved from the junction point with the first end in front by way of a first feed opening or with the second end in front by way of a second feed opening.

By using the method according to the present invention, fastening devices can be supplied with fastening elements that require a feed of fastening elements with differing orientations.

According to an advantageous development of the method, the fastening elements are transported singly to the junction point. This enables the process to run without interruption.

According to yet another advantageous development of the method, following a lead fastening element, a further fastening element can be supplied to the junction point when the lead fastening element has been moved from the junction point. This enables selective feed of fastening elements to the fastening devices.

According to yet another advantageous development of the method, the fastening elements are moved from the feed track to a junction point through a feed chamber. In particular, the fastening elements are moved into the junction point over an inclined surface adjacent to the junction point. This has the advantage that the fastening elements arrive in the junction point automatically.

To remove each fastening element from the junction point, depending on the desired transport direction, a pressure medium, in particular compressed air, could be applied to the first or the second feed openings so that the fastening element is transported out of the junction point through the first or the second feed openings.

To prevent the fastening elements, which are situated in the feed track from being disrupted when the pressure medium is applied to the junction point, according to yet another advantageous development of the method, at least the feed track is closed off at least during the pressure application.

The feed of fastening elements to the junction point is effected preferably by means of a movable ram.

Preferably, the ram is movable between two end positions. In particular, it is proposed that in a first end position it opens the feed track so the ram can receive a fastening element. In a second end position the ram preferably has a sealing effect, so at least the feed track is closed and sealed.

Further, according to this invention, a device for feeding fastening elements with a first and a second end, in particular rivets, preferably blind rivets, has a feed track and at least one junction point located in the feed passage. The feed passage is formed by a first feed opening and a second feed opening, which are in communication. The first or the second feed opening can preferably be connected to a pressure medium source so a fastening element situated in the junction point can be removed from the junction point through the corresponding feed opening, depending on whether the pressure medium source is connected to the first or the second feed openings.

Preferably, the device has a feed chamber linking the feed track to the junction point. In particular, a surface which is adjacent the feed chamber is characterized in that it is inclined downward with respect to a horizontal line. This portion forms a kind of slide on which a fastening element can slide into the junction point.

The movable ram is provided for selective and sequential transport of fastening elements from the feed track to an inclined surface and into the junction point.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 2 is a partial view showing a one type of a fastening element supported in a first orientation within a feed track of the feeding device of FIG. 1;

FIG. 3 is a partial view showing the fastening element of FIG. 2 supported in a second orientation within the feed track of the feeding device of FIG. 1;

FIG. 4 is a schematic representation of the feeding device of FIG. 1, a pressure supply unit and a fastening tool showing the feeding of the fastening element of FIG. 2 in the first orientation through the feeding device of FIG. 1 to the fastening tool, in accordance with certain principles of the invention;

FIG. 5 is a schematic representation of the feeding device of FIG. 1, the pressure supply unit and the fastening tool, both of FIG. 4, showing the feeding of the fastening element of FIG. 2 in the second orientation through the feeding device of FIG. 1 to the fastening tool, in accordance with certain principles of the invention;

DETAILED DESCRIPTION OF THE PREFERRED EMBODIMENT

Referring to FIGS. 2 and 3, a first design of a fastening element 30 is shown in a form representative of a rivet, such as, for example, a blind rivet. The fastening element 30 includes an intermediate flange 32, a head 34 joined with and extending axially from the flange in a first direction, and a mandrel 36 joined with and extending axially from the flange in a second direction, axially opposite the first direction. The head 34 represents a first end of the fastening element 30, and the mandrel 36 represents a second end of the fastening element.

Figure 1:
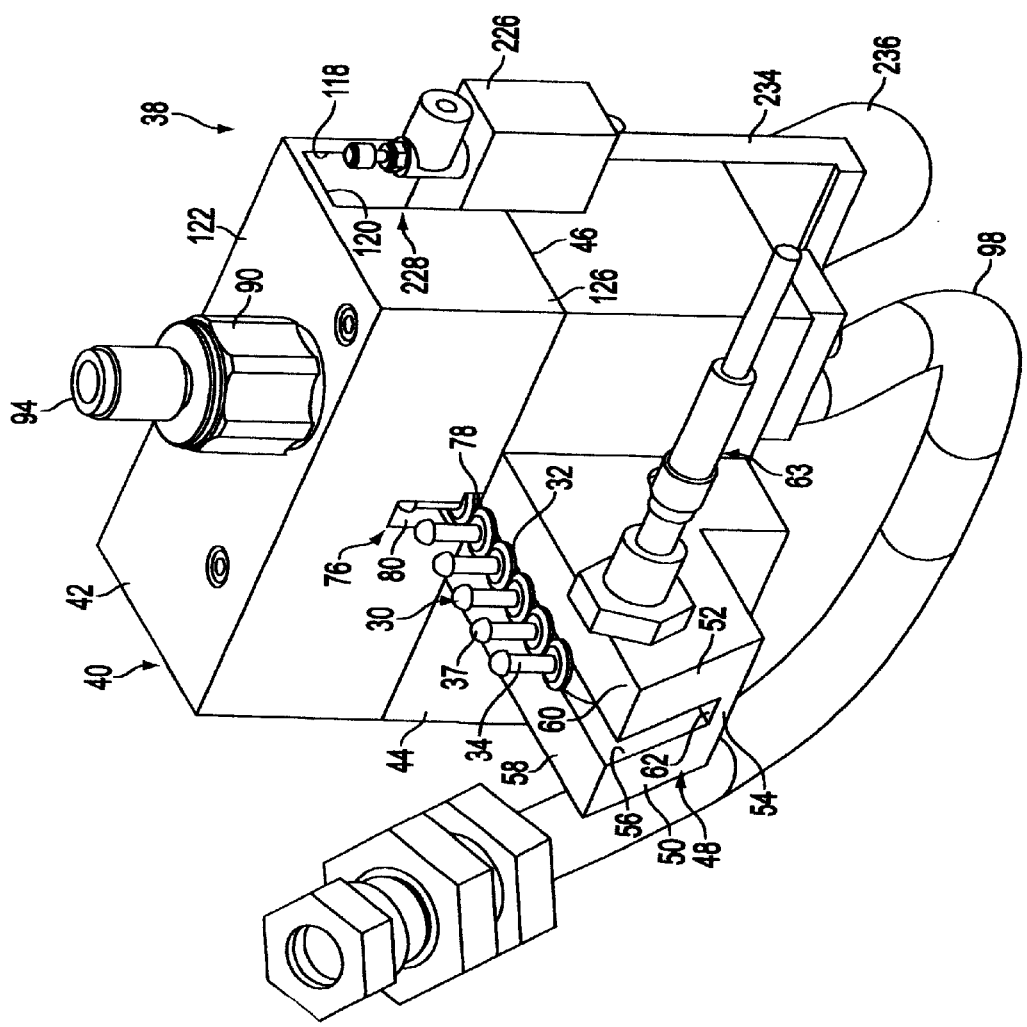
FIG. 1 is a perspective view showing a device for feeding fastening elements in accordance with certain principles of the invention.
Figure 18:
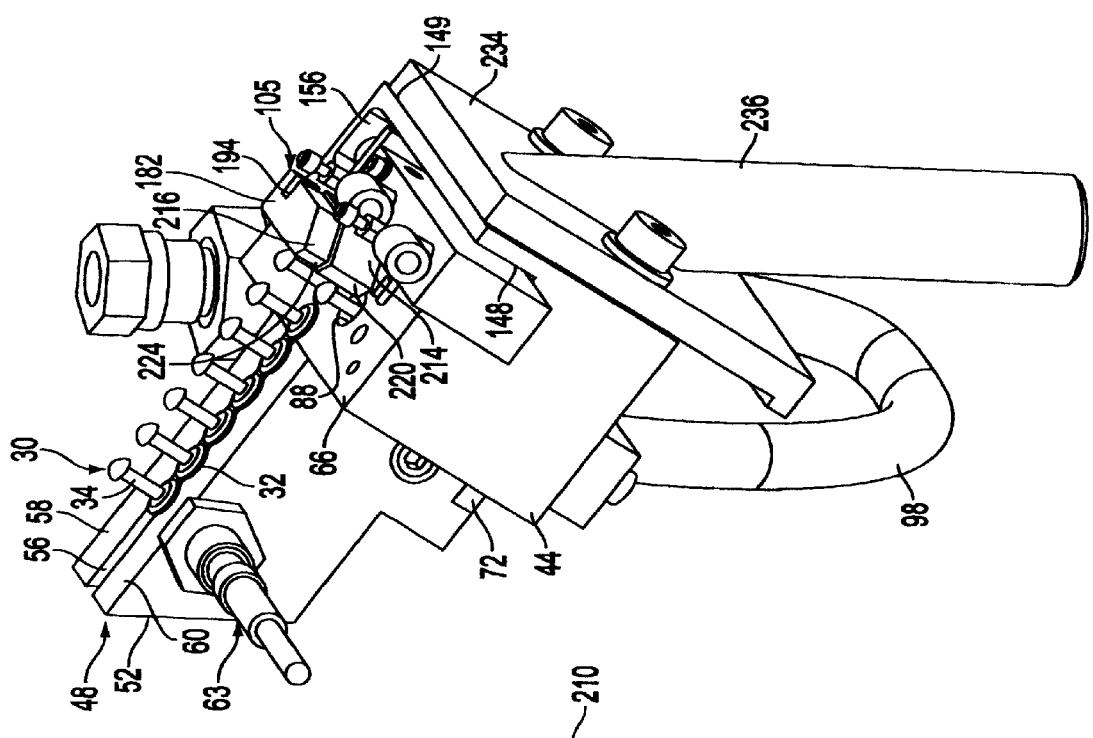
FIG. 18 is a perspective view of the feeding device of FIG. 1 with the upper housing member of FIG. 7 removed to reveal a pneumatic cylinder and the transfer slide of FIG. 14 in assembly with the lower housing member of FIG. 10 in accordance with certain principles of the invention.

As shown in FIGS. 1 and 18, a second design of the fastening element 30 is similar to the first design thereof (FIGS. 2 and 3), and further includes a rounded dome 37 on an axially outboard surface of the head 34.

A feed device 38 for feeding and transporting, individually, one or more of the fastening elements 30, of either design, includes a housing 40, which is formed by an upper housing member 42 and a lower housing member 44 that are connected to one another along a dividing plane 46.

A feed track 48 is formed by spaced members 50 and 52, which are joined at the base thereof by a linking web 54, which could be formed integrally with the spaced members. The spaced members 50 and 52 form a feed space 56 therebetween, with adjacent support surfaces 58 and 60, respectively, being located in a common plane. The feed space 56 includes a base floor 62, which is formed by an upper surface of the web 54. An orienting and feeding unit (not shown), such as, for example, a vibratory hopper, is positioned adjacent an outboard end of the feed track 48 to facilitate the inline feeding of properly oriented fastening elements 30 into and through the feed space 56. A fastening-element detection sensor 63 is attached to a side of the feed track 48, and senses the presence, or absence, of fastening elements 30 within the feed track and controls the vibratory hopper accordingly.

Referring again to FIG. 2, the center of gravity of the fastening element 30 illustrated therein is located in the mandrel 36 thereof, near the flange 32 of the element. Consequently, the fastening element 30 of FIG. 2 is fed through the feed track 48 in the position illustrated, which will be referred to as the upright position. In the upright position, portions of a first major surface of the flange 32 are resting on the planar-aligned surfaces 58 and 60, with the remaining portions of the first major surface thereof straddling the feed space 56. In this position, the flange 32 and the head 34 of the fastener element 30 are above, and outside of, the feed space 56, while the mandrel 36 is located within the feed space.

Referring again to FIG. 3, the center of gravity of the fastening element 30 illustrated therein is located in the head 34 thereof, near the flange 32 of the element. Consequently, the fastening element 30 of FIG. 3 is fed through the feed track 48 in the position illustrated, which will be referred to as the inverted position. In the inverted position, portions of a second major surface of the flange 32 are resting on the planar-aligned surfaces 58 and 60, with the remaining portions of the second major surface thereof straddling the feed space 56. In this position, the flange 32 and the mandrel 36 of the fastener element 30 are above, and outside of, the feed space 56, while the head 34 is located within the feed space.

Figure 10:
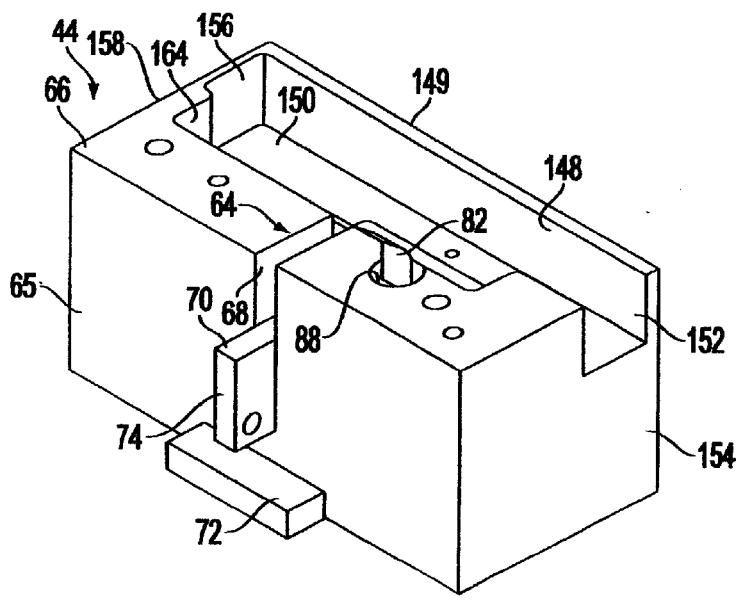
FIG. 10 is a perspective view of a lower housing member of the feeding device of FIG. 1 showing features of the member in accordance with certain principles of the invention.

As shown in FIG. 1, the feed track 48 is located adjacent, and is attached to, the lower housing member 44, with the feed track 48 being aligned with a feed track 64 (FIG. 10) formed in an exterior side 65 of the lower housing member. Referring to FIG. 10, the feed track 64 is formed by a portion of an upper surface 66 of the lower housing member 44, a feed space 68 and a base floor 70. The upper surface 66 of the lower housing member 44 is aligned and planar with the spaced support surfaces 58 and 60 of the feed track 48, and the feed space 56 and the base floor 62 of the feed track 48 are aligned with the feed space 68 and the base floor 70 of the lower housing member 44, respectively.

The lower housing member 44 is also formed with a shelf 72, on which a forward underside of the feed track 48 rests, and with a locking bar 74. When the lower housing member 44 and the upper housing member 42 are assembled, the locking bar 74 extends into a forward lower portion of the feed space 56 of the feed track 48, with facility for locking the feed track 48 with the lower housing member. It is noted that the upper surface of the locking bar 74 forms the base floor 70 of the feed track 64.

Figure 7:
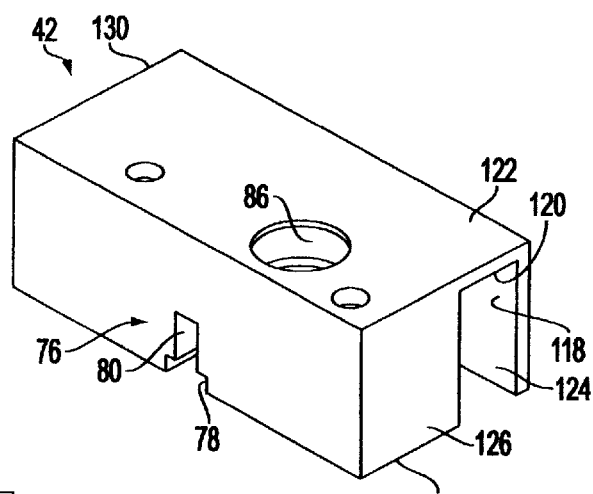
FIG. 7 is a perspective view of an upper housing member of the feeding device of FIG. 1 showing features of the member in accordance with certain principles of the invention.

Referring to FIGS. 1 and 7, the upper housing member 42 is formed with a feed track 76, having a wide feed space 78 at the bottom thereof, and a narrow feed space 80, which extends upward from, and is in communication with the wide feed space. It is noted that the width of the feed space 56 of the feed track 48 is the same as the width of the narrow feed space 80 of the feed track 76.

When the upper housing member 42 is assembled with the lower housing member 44, as shown in FIG. 1, the feed space 68 of the feed track 64 and the narrow feed space 80 of the feed track 76 are in alignment, with the wide feed space 78 being located between the feed space 68 and the narrow feed space 80. The wide feed space 78 provides an open path for the flange 32 of the fastening element 30, while the feed space 56 of the feed track 48, the feed space 68 of the feed track 64, and the narrow feed space 80 of the feed track 76 provide paths for either the head 34 or the mandrel 36, depending on whether the fastening element is in the upright position or the inverted position. Also, the portions of the upper surface 66 of the lower housing member 44, which are adjacent the feed space 68, are in planar alignment with the support surfaces 58 and 60 of the feed track 48 to provide continued support for the flange 32 of the fastening element 30 as the element is being fed therethrough.

With the structure as described above, the feed track 48, the feed track 64, and the feed track 76 combine to form a common feed passage through which the fastening elements 30 are fed.

As illustrated schematically in FIG. 4, the housing 40 is formed with an inclined surface or ramp 82, located in the lower housing member 44, which is in communication with a pressurized feed passage 84. The pressurized feed passage 84 is formed by a first tube-like feed opening 86, which is formed in, and through, the upper housing member 42, and a second tube-like feed opening 88, which is formed in, and through, the lower housing member 44. The first feed opening 86 is in axial alignment with the second feed opening 88, and combine to provide a continuous pathway, in the form of the pressurized feed passage 84, through the housing 40. Each of the first feed opening 86 and the second feed opening 88 extends to a respective downstream point, as described below.

A first coupler 90 is attached to an outboard mouth of the first feed opening 86, and a second coupler 92 is attached to an outboard mouth of the second feed opening 88. The first and second couplers 90 and 92 represent the respective downstream points of the first and second feed openings 86 and 88, respectively. A first feed tube 94, having a through passage 96, is attached to the first coupler 90, with the through passage thereof being in communication with the pressurized feed passage 94. A second feed tube 98, having a through passage 100, is attached to the second coupler 92, with the through passage thereof being in communication with the pressurized feed passage 84.

As shown in FIG. 4, the fastening element 30 is fed into the housing 40 in the upright position. In this mode, an outboard end of the first feed tube 94 is attached to a pressure medium source 102. Also, an outboard end of the second feed tube 98 is attached to a fastener device 104 for applying the fastening element 30 to a workpiece (not shown).

Figure 6:
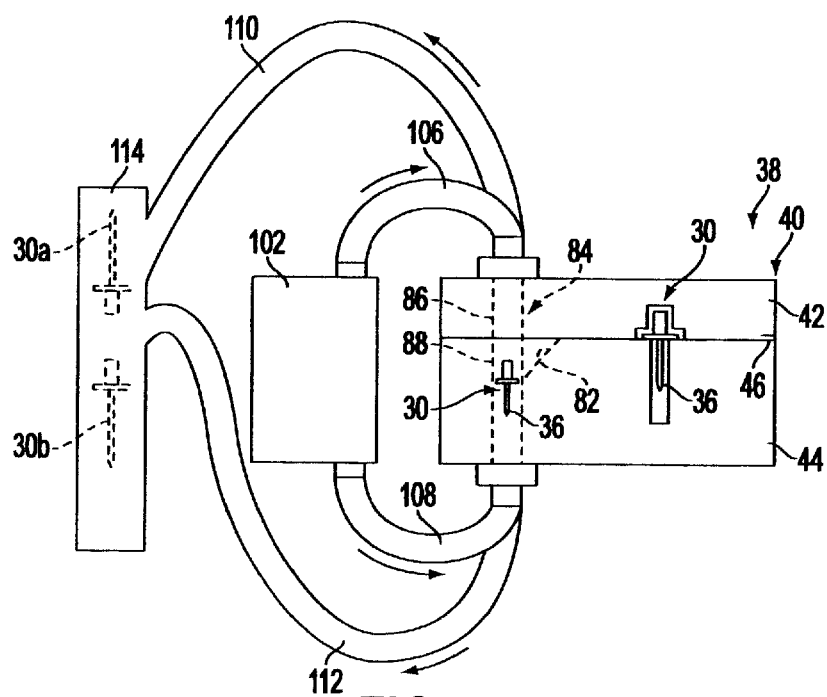
FIG. 6 is a schematic representation of the feeding device of FIG. 1, a pressure supply unit and a fastening tool showing the feeding of the fastening element of FIG. 2 through the feeding device of FIG. 1 to the fastening tool in either of two, in accordance with certain principles of the invention.
Figure 14:
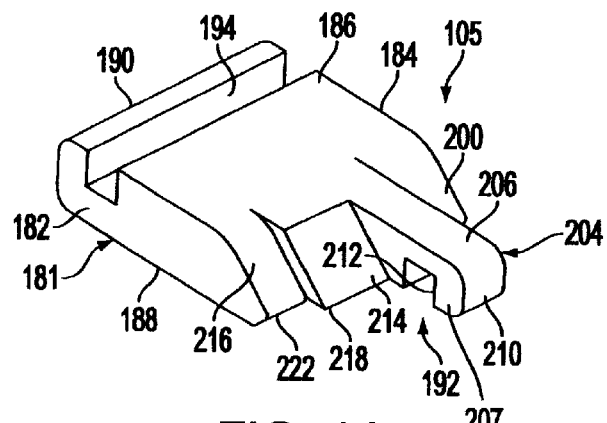
FIG. 14 is a perspective view showing a transfer slide of the feeding device of FIG. 1 for transferring the fastening element of FIG. 2 between spaced locations within the feeding device in accordance with certain principles of the invention.

The fastening element 30 is transferred within the housing 40, from the position illustrated in FIG. 4 to the inclined surface 82 or ramp, by a ram 105 or transfer slide (FIG. 14). As illustrated in FIG. 6, the fastening element 30 is guided by the inclined surface 82 into a junction point located within the second feed opening 88, adjacent a base of the inclined surface. Note that the junction point is at the same location within the second feed opening 88, in each of the embodiments illustrated in FIGS. 4, 5 and 6.

Referring again to FIG. 4, with the application of a pressurized medium, such as, for example, air, from the pressure medium source 102, in the direction of the arrows in the feed tubes 94 and 98, the fastening element 30 is transported through the second feed tube 98 to the fastening device 104, with the mandrel 36, or second end, being in the forward or lead position for ultimate assembly of the fastener element with the workpiece.

Referring to FIG. 5, the fastening element 30 is fed into the housing 40 in the inverted position. In this mode, the pressure medium source 102 is connected to the outboard end of the second feed tube 98, and the fastening device 104 is connected to the outboard end of the first feed tube 94. The fastening element 30, in the inverted position, is transferred to the inclined surface 82, within the housing 40, and onto the inclined surface, and then into the junction point of the pressurized feed passage 84. With the pressurized medium being fed in the direction of the arrows within the feed tubes 94 and 98, the fastening element 30 is fed into the fastening device 104 with the mandrel 36, or second end, in the forward or lead position for ultimate assembly of the fastening element with the workpiece.

Thus, the feed device 38 as illustrated in FIGS. 4 and 5, and as described above, provide a first means for arranging the fastening element 30 in a given orientation at the junction point such that the first end of the fastening element is a front end thereof when the element is to be moved through the first feed opening 86, and the second end of the fastening element is a front end thereof when the fastening element is to be moved through the second feed opening 88.

Referring to FIG. 6, the pressure medium source 102 is connectable, through a pair of pressure feed tubes 106 and 108, to either of the opposite ends of the pressurized feed passage 84 of the housing 40, to direct the pressure medium in either direction, but in only one direction at a time, as selected. In addition, a pair of element feed tubes 110 and 112 are selectively connectable to opposite ends of the pressurized feed passage 86 of the housing 40. The opposite ends of the element feed tubes 110 and 112 are connected to a fastener-element handling device 114, which could be a fastener device, for receiving the fastener elements 30.

If the fastener element 30 is fed into the housing 40 in the upright position, as illustrated, or in the inverted position, the fastener element could be transported through the feed device 38 and arrive at the handling device 114 in either of the two orientations represented in phantom by the elements 30a and 30b, depending on the selected direction of feed of the pressure medium through the feed tubes 110 and 112. The pressure feed tubes 106 and 108, and the element feed tubes 110 and 112, can be permanently connected as illustrated in FIG. 6, and can be selected for feeding the fastening element 30 in either the upright or inverted position by use of a control module (not shown) for selectively opening or closing portals located at the ends of the pressure feed tubes 106 and 108, and the element feed tubes 110 and 112.

Thus, the feed device 38 as illustrated in FIG. 6, and as described above, provides a second means for arranging the fastening element 30 in a given orientation at the junction point such that the first end of the fastening element is a front end thereof when the element is to be moved through the first feed opening 86, and the second end of the fastening element is a front end thereof when the fastening element is to be moved through the second feed opening 88.

Figure 8:
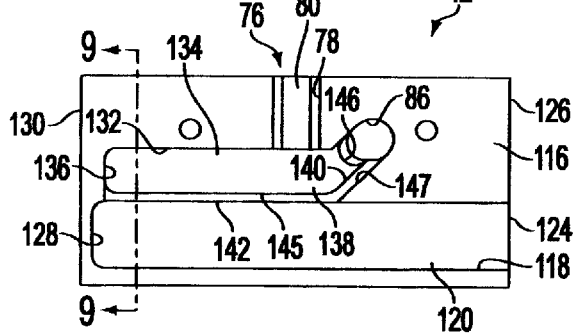
FIG. 8 is a bottom view of the upper housing member of FIG. 7 showing detailed structure within the upper housing member in accordance with certain principles of the invention.
Figure 9:
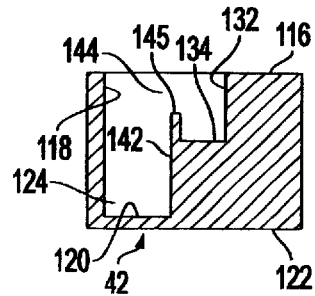
FIG. 9 is a sectional view taken along line 9—9 of FIG. 8 also showing detailed structure within the upper housing member in accordance with certain principles of the invention.

Referring to FIGS. 7, 8 and 9, the upper housing member 42 is further formed with an undersurface 116, which interfaces with the upper surface 66 (FIG. 10) of the lower housing member 44, when the upper and lower housing members are assembled together to form the housing 40. An elongated open-end channel 118 is formed in the undersurface 116 of the upper housing member 42, and is formed with a ceiling 120 thereof near an upper exterior surface 122 of the upper housing member. The channel 118 is formed with an open end 124 at a first exterior end 126 of the upper housing member 42, and extends to a closed end 128 of the channel, near a second exterior end 130 of the upper housing member.

A elongated closed channel 132 is also formed in the undersurface 116 of the upper housing member 42, and extends inward from the undersurface to a ceiling 134 of the closed channel, the ceiling being located at a distance from the undersurface which is slightly less than one-half the distance of the ceiling 120 from the undersurface. The closed channel 132 extends linearly from a rear wall 136 thereof, toward the first exterior end 126 of the upper housing member 42. The closed channel 132 is formed at an angle at a juncture 138 thereof, and continues to a first forward wall 140 of the closed channel, which is in communication with the first feed opening 86 of the upper housing member 42. The first forward wall 140 is formed at a prescribed angle with respect to the linear extent of the closed channel 132.

As shown in FIG. 8, a fence 142 extends along the length of the closed channel 132, and is formed between portions of the elongated channel 118 and the closed channel. As shown in FIG. 9, the fence 142 extends outward from the plane of the ceiling 134 toward the undersurface 116 for a short distance, which is less than the total distance between the ceiling and the undersurface. This arrangement provides an open space 144, which extends between an upper surface 145 of the fence 142 and the undersurface 116, thereby allowing communication between portions of the channel 118 and the channel 132, adjacent the undersurface.

As shown in FIG. 8, an inclined surface 146 is formed at, and joins, the first closed-end wall 140 of the closed channel 132, and provides a transition surface between the closed channel and the first feed opening 86 of the upper housing member 42. Also, a second forward wall 147 of the closed channel 132 is formed in the upper housing member 42 contiguous with, and between, a portion of the top 145 of the fence 142 and the undersurface 116, adjacent the first feed opening 86. The second forward wall 147 is parallel with, spaced outward from, and is formed at the same prescribed angle as, the first forward wall 140 of the closed channel 132. A gap is formed in a portion of the wall surface of the first feed opening 86 which extends from the top 145 of the fence 142 to the undersurface 116, at a juncture where the walls 140 and 147 intersect with the first feed opening.

Referring to FIGS. 10, 11, 12 and 13, the lower housing member 44 is formed with the upper surface 66, which interfaces with the undersurface 116 (FIG. 10) of the upper housing member 42, when the upper and lower housing members are assembled together to form the housing 40. An elongated open-end channel 148 is formed in the upper surface 66 of the lower housing member 44 along an exterior side 149 thereof, and is formed with a floor 150. The channel 148 is formed with an open end 152 at a first exterior end 154 of the lower housing member 44, and extends to a closed end 156 of the channel, near a second exterior end 158 of the lower housing member.

Figure 11:
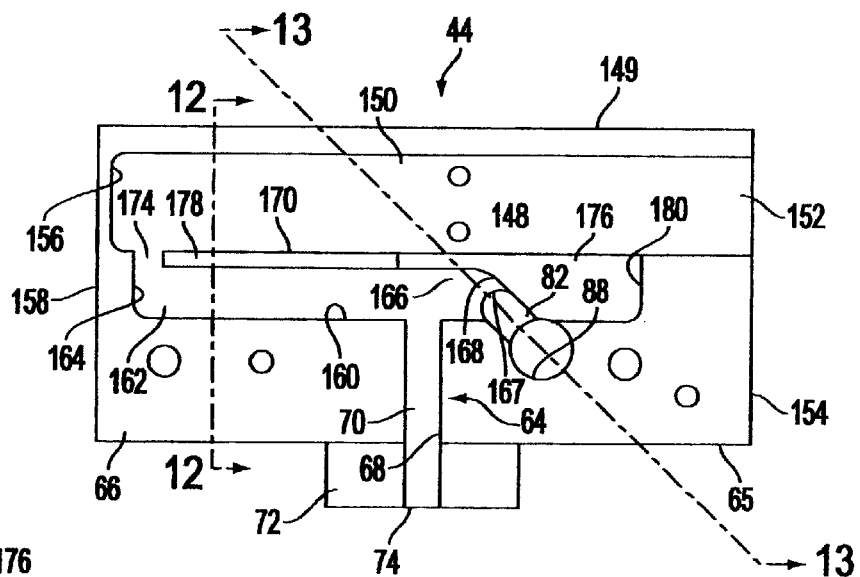
FIG. 11 is a top view of the lower housing member of FIG. 7 showing detailed structure within the lower housing member of FIG. 10 in accordance with certain principles of the invention.

An elongated closed channel 160 is also formed in the upper surface 66 of the lower housing member 44, and extends inward from the upper surface to a floor 162 of the closed channel. As shown in FIG. 11, the closed channel 160 is parallel to, and slightly spaced from, the channel 148. The floor 162 of the closed channel 160 is flush or planar with the floor 150 of the channel 148. The closed channel 160 extends linearly from a rear wall 164 thereof, toward the first exterior end 154 of the lower housing member 44.

As further shown in FIG. 11, the closed channel 160 is formed at an angle at a juncture 166, and continues to a camming wall 168 thereof, which is formed at a prescribed angle with respect to a fence 170 extending from the floors 150 and 162 between the open-end channel 148 and the closed channel 160. The floor 162 of the closed channel 160 extends slightly beyond the juncture 166 and toward the camming wall 168, and joins with an adjacent upper end of the inclined surface 82. An opening 167 is formed in the floor 162 about the upper end of the inclined surface 82, whereby the closed channel 160 is in communication with the second feed opening 88 of the lower housing member 44, through the opening.

Figure 12:
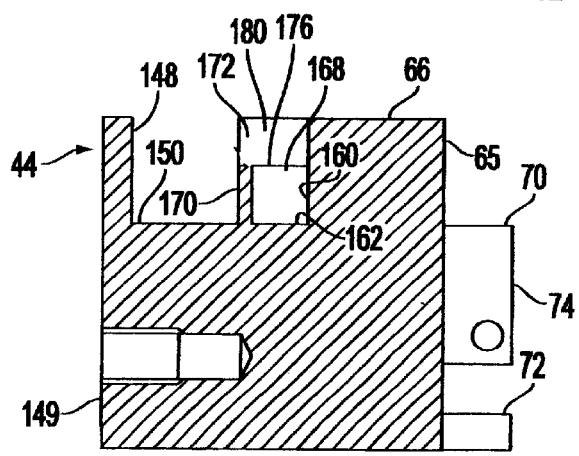
FIG. 12 is a sectional view taken along line 12—12 of FIG. 11 also showing detailed structure within the lower housing member of FIG. 10 in accordance with certain principles of the invention.
Figure 13:
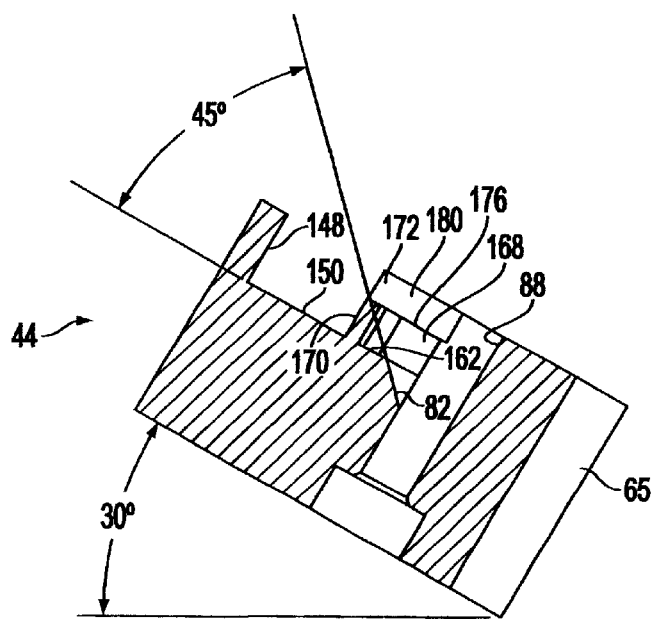
FIG. 13 is a sectional view taken along line 13—13 of FIG. 11 also showing detailed structure within the lower housing member of FIG. 10 in accordance with certain principles of the invention.

As shown in FIGS. 11, 12 and 13, the fence 170 is formed in the lower housing member 44 and is located between the open-end channel 148 and the closed channel 160. The fence 170 extends along a substantial portion of the closed channel 160, between the rear wall 164 and the camming wall 168 of the closed channel.

As shown in FIG. 11, an opening 171 is formed in a side wall of the closed channel 160 adjacent the second feed opening 88, and provides direct communication between the closed channel and the second feed opening.

As shown in FIG. 12, the fence 170 extends outward from the plane of the floors 150 and 162 toward the upper surface 66 of the lower housing member 44 for a distance which is less than the full distance between the plane of the floors and the upper surface, to thereby provide a first open space 172. The first open space 172 provides for communication between portions of the channel 148 and the channel 160, adjacent the upper surface 66. The inclined surface 82 (FIGS. 11 and 13), which is located at the camming wall 168 of the closed channel 160, provides a transition surface between the closed channel and the second feed opening 88 of the lower housing member 44.

Referring to FIG. 13, the inclined surface 82 is formed within the lower housing member 44 at an angle of forty-five degrees with respect to a plane which includes the floor 162 of the closed channel 160. Also, as will be described hereinbelow, the lower housing member 44 is tilted at an angle of thirty degrees from a horizontal plane, when the lower housing member is mounted in its element-feeding position.

As shown in FIG. 11, a second open space 174 is formed between the open-end channel 148 and the closed channel 160, adjacent the rear wall 164 of the closed channel, and in the plane of the fence 170. The second open space 174 provides further communication between the open-end channel 148 and the closed channel 160, outward from the plane of the floors 150 and 162.

As shown in FIGS. 11 and 12, a shelf 176 is formed in, and recessed below, the upper surface 66 generally between a plane of the camming wall 168 and a forward wall 180 of the lower housing member 44. The shelf 176 extends to a location generally adjacent and spaced from an exit or element-discharge end of the feed track 64 to form an upper surface of a forward portion of the fence 170. The remainder of the fence 170 is formed with an upper surface 178, which is located in a plane parallel to a plane of the shelf 176, and is located farther from the upper surface 66 than the shelf.

Figure 15:
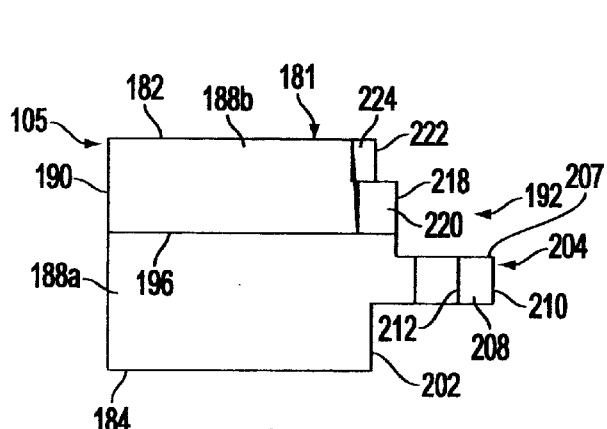
FIG. 15 is a side view of the transfer slide of FIG. 14 showing detailed structure in accordance with certain principles of the invention.

Referring now to FIGS. 14 and 15, the ram 105 is formed with a body 181 having opposite side surfaces 182 and 184, a top surface 186, a bottom area 188, a rear surface 190 and a front or forward area 192. As shown in FIG. 14, a drive channel 194 is formed in the top surface 186 near the rear surface 190 thereof, and extends between the opposite side surfaces 182 and 184, with opposite ends of the channel being open.

Figure 16:
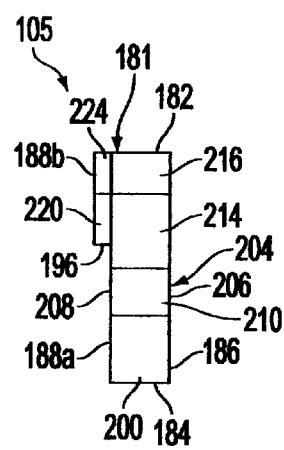
FIG. 16 is an end view of the transfer slide of FIG. 14 showing detailed structure in accordance with certain principles of the invention.

As shown in FIGS. 15 and 16, two bottom surfaces 188a and 188b are formed in the bottom area 188 of the body 181, in spaced parallel planes, with the surface 188b extending farther from the body than the surface 188a. A ledge 196 is formed between, and joins, adjacent inboard edges of the two surfaces 188a and 188b. In a front-to-rear direction, the two surfaces 188a and 188b extend between the front area 192 and the rear surface 190. In a side-to-side direction, the surface 188a extends between the side surface 184 and the ledge 196, and the surface 188b extends between the side surface 182 and the ledge.

As illustrated in FIG. 14, in the front area 192 of the ram 105, a first ramped surface 200 extends in a forward direction from the top surface 186 of the body 181, and downward toward the bottom surface 188a at an angle which is complementary to the prescribed angle of the camming wall 168 (FIG. 11) of the closed channel 160. The ramped surface 200 is contiguous with the side surface 184 of the body 181, and forms a forward edge 202 (FIG. 15) at a juncture with the bottom surface 188a.

Figure 17:
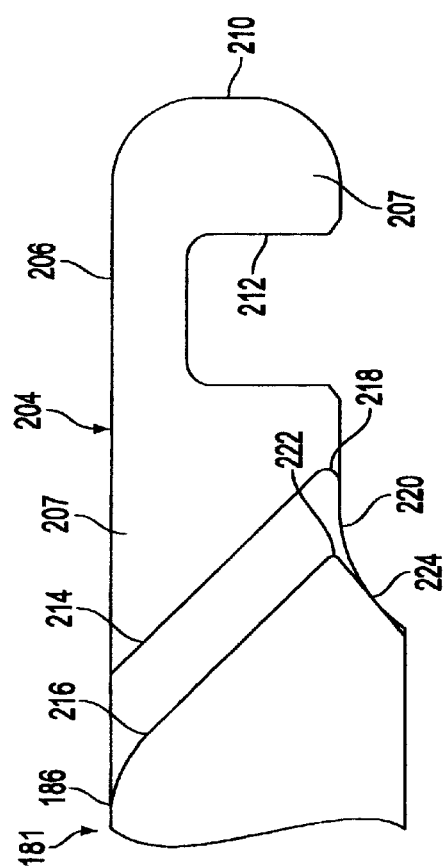
FIG. 17 is an enlarged partial top view of the transfer slide of FIG. 14 showing detailed structure in accordance with certain principles of the invention.

Referring to FIGS. 14, 15 and 17, a receptor arm 204 extends forward from the front area 192 of the body 181 and, with respect to the side surface 184 of the body, is inboard of and adjacent the first ramped surface 200. The receptor arm 204 is formed with a top surface 206, which is flush with, or in the plane of, the top surface 186 of the body 181, and a side surface 207. Also, as shown in FIG. 15, the receptor arm 204 is formed with a bottom surface 208, which is flush with, or in the plane of, the bottom surface 188*a* of the body 181. Further, the receptor arm 204 is formed with a forward surface 210 at an outboard end thereof, which is the farthest surface of the receptor arm 204 from the body 181. A rivet receptor slot 212 is formed in the bottom surface 208 of the receptor arm 204, at a location intermediate the body 181 and the forward surface 210, and extends laterally of the arm through opposite side surfaces of the arm.

As illustrated in FIGS. 14 and 17, in the front area 192 of the ram 105, a second ramped surface 214 extends in a forward direction from the top surface 186 of the body 181, and downward toward the bottom surface 188*b* at an angle which is complementary to the prescribed angle of the second forward wall 147 (FIG. 8) of the upper housing member 42. The ramped surface 214 is located between, and is contiguous with, the receptor arm 204 and a third ramped surface 216, a side surface of which is formed by a portion of the side surface 182 of the body 181.

The ramped surface 214 extends to an edge 218 thereof, located in a plane which includes the bottom surface 188*a*. An arcuate surface 220 is formed between the edge 218 of the ramped surface 214 and the bottom surface 188*b* of the body 181, and extends from the edge toward the rear surface 190 (FIG. 15) of the body. The arcuate surface 220 is formed with a curvature, or radius, which is essentially the same as the circumferential curvature, or radius, of an internal wall surface of the first feed opening 86 (FIG. 8) of the upper housing member 42. In essence then, the surface 220 of the ram 105 and the wall surface of the feed passage 84 are formed in the same prescribed shape.

As further illustrated in FIGS. 14 and 17, in the front area 192 of the ram 105, the third ramped surface 216 extends in a forward direction from the top surface 186 of the body 181, and downward toward the bottom surface 188*b* at an angle complementary to the prescribed angle of the first forward wall 140 (FIG. 8) of the upper housing member 42. The ramped surface 216 extends to an edge 222 thereof, located in a plane which includes the bottom surface 188*b*. A flat surface 224 is formed between the edge 222 of the ramped surface 216 and the bottom surface 188*b* of the body 181, and extends from the edge toward the rear surface 190 (FIG. 15) of the body.

When the upper housing member 42 and the lower housing member 44 are assembled to form the housing 40, the closed channel 132 and the closed channel 160, respectively, are in interfacing communication to form a feed chamber. The ram 105 is located and movable within the feed chamber to receive and transport the fastening elements 30 from the element-discharge end of the feed track 64 to the junction point within the second feed opening 88.

As shown in FIG. 1, a pneumatic cylinder 226 is mounted partially within an open chamber 228 formed by the open channels 118 and 148 when the upper housing member 42 and the lower housing member 44, respectively, are assembled. Referring to FIGS. 19, 20, 21 and 22, the upper housing member 42 has been removed to reveal the pneumatic cylinder 226 being mounted within a portion of the chamber 228 (FIG. 1), which is formed by the open channel 148 of the lower housing member 44. A piston rod 230 is extendable from an end 231 of the cylinder 226 toward the closed end 156 of the open channel 148, and is shown in the fully extended position. The free end of the piston rod 230 is coupled to a drive bar 232 by a coupler 233.

Figure 19:
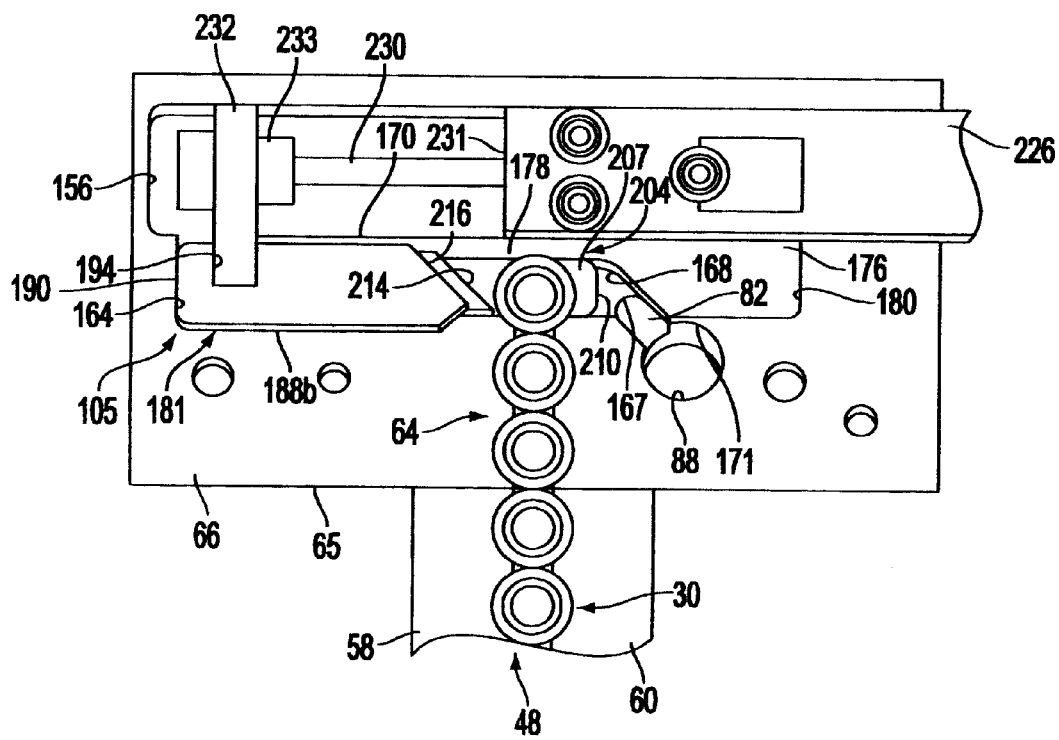
FIG. 19 is a partial top view of the lower housing member of FIG. 10 showing the transfer slide of FIG. 14 in position to receive a lead fastening element from a row of such elements in accordance with certain principles of the invention.

As shown in FIG. 19, the ram 105 is mounted in a portion of the closed channel 160 of the lower housing member 44, which forms a lower portion of the feed chamber, such that a lateral extension of the drive bar 232 is located in the drive channel 194 of the ram. The space 144 (FIG. 9) of the upper housing member 42, and the space 172 (FIG. 12) of the lower housing member 44, when assembled to form the housing 40, provide sufficient opening between the interfacing upper surfaces 145 and 178 of the fences 142 and 170, respectively, to allow movement of the ram within the feed chamber toward the first exterior end 154 of the lower hosing member 44.

When the upper housing member 42 and the lower housing member 44 are assembled to form the housing 40, the first ramped surface 200 and the receptor arm 204 of the ram will be located in the lower housing member, and the second ramped surface 214 and the third ramped surface 216 of the ram 105 will be located in the upper housing member.

Referring to FIG. 18, a plate 234 is attached to the exterior side 149 of the lower housing member 44, and is secured to a vertical support column 236, which is mounted on a support platform (not shown) such as, for example, a floor. The plate 234 is attached to the column 236 in such a manner that the lower housing member 44, and consequently the upper housing member 42, is mounted at an angle of thirty degrees with respect to a plane which is perpendicular to the vertical column. The angular tilt of thirty degrees of the lower housing member 44 is also illustrated in FIG. 13.

Referring to FIG. 19, the piston rod 230 is fully extended toward the closed end 156, whereby the rear surface 190 of the ram 105 is in engagement with the rear wall 164. With this arrangement, the receptor slot 212 (FIGS. 14 and 17) of the receptor arm 204 is facing, and aligned with, the feed track 64 at a loading station of the device 38. A plurality of the fastening elements 30 are located serially in the feed tracks 48 and 64, and are fed by gravity, as illustrated in FIG. 18, toward, and into, the housing 40 (FIG. 1).

With the slot 212 of the ram 105 facing and aligned with the element-discharge end of the track 64, the lead fastening element 30 is thereby moved into the slot, with the flange 32 of the lead fastening element resting on a portion of the side surface 207 of the receptor arm 204, which surrounds the slot. In this mounting of the lead fastening element 30, a free end portion of the mandrel 36 (FIG. 2) extends clearly below, and outside of, the receptor slot 212.

Figure 20:
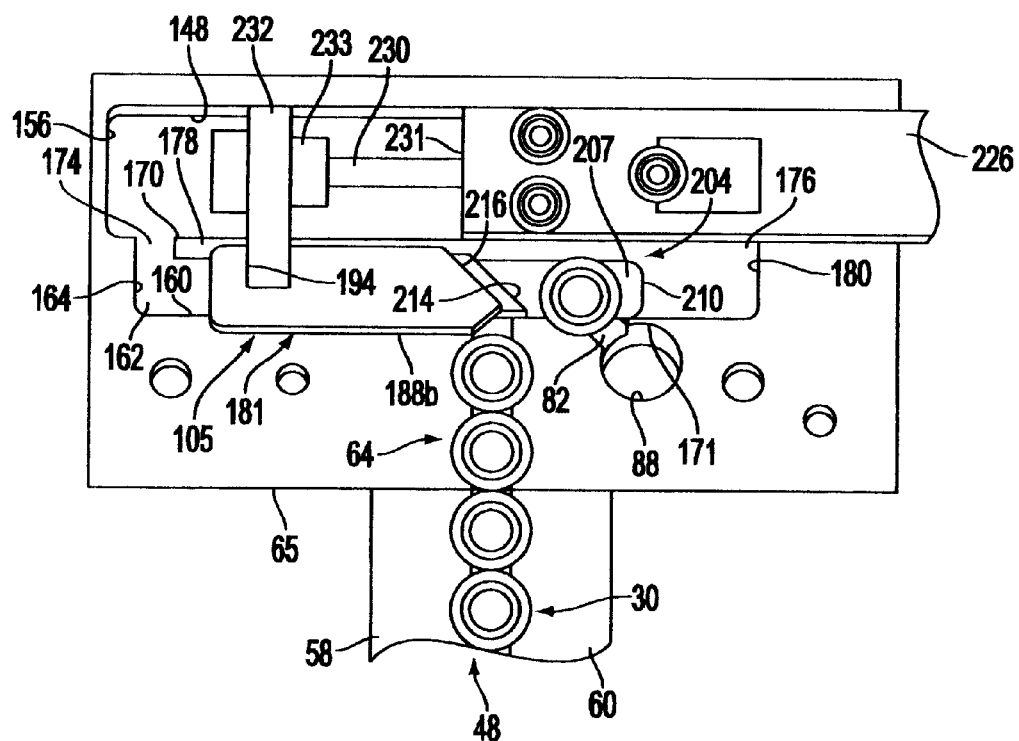
FIG. 20 is a partial top view of the lower housing member of FIG. 10 showing the transfer slide of FIG. 14 in position to deposit the lead fastening element of FIG. 19 into a feed passage formed in the lower housing member in accordance with certain principles of the invention.
Figure 21:
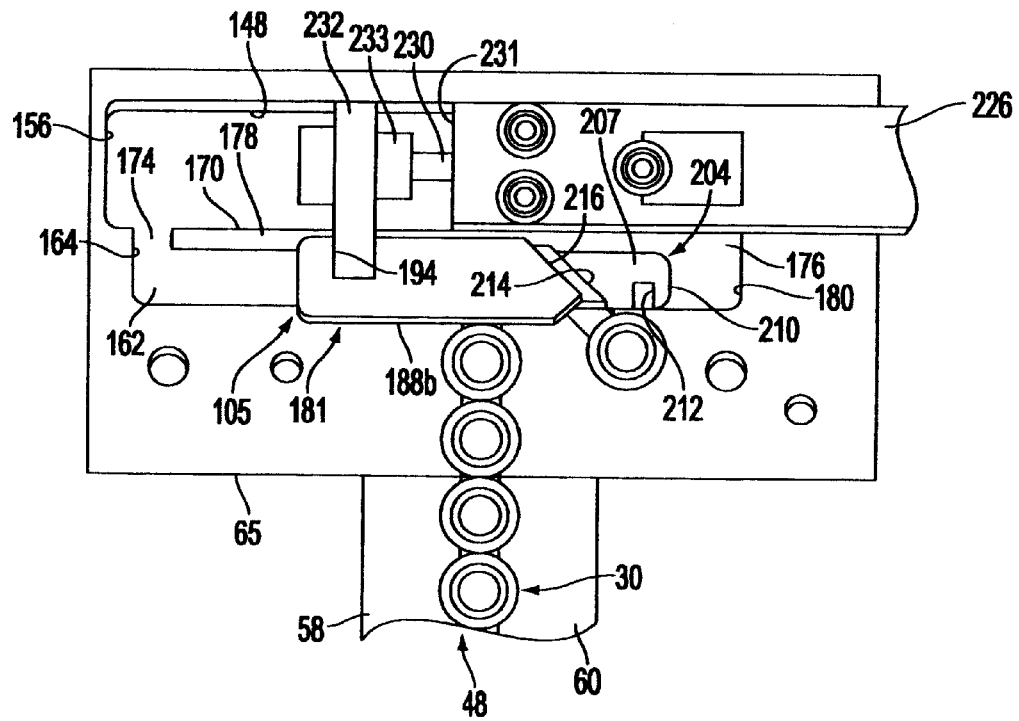
FIG. 21 is a partial top view of the lower housing member of FIG. 10 showing the transfer slide of FIG. 14 in an extended position and the lead fastening element of FIG. 19 located in the feed passage of FIG. 20 in accordance with certain principles of the invention.

Referring to FIG. 20, the piston rod 230 has been retracted partially into the cylinder 226, whereby the drive bar 232 has moved the ram 105 toward the forward wall 180 of the closed channel 160, to position the lead fastening element 30 near the inclined surface 82 and the second feed opening 88. Upon continued movement of the ram 105 toward the forward wall 180, the extended free end portion of the mandrel 36 of the lead fastening element 30 engages the camming surface 168, whereby the lead fastening element is cammed out of the receptor slot 212 of the receptor arm 204, at an unloading station. As the lead fastening element 30 is moved from a supported position on the side surface 207 of the receptor arm 204, the free end of the mandrel 36 is moved onto, and the element is moved over, the inclined surface 82 and the element is guided downward into the second feed opening 88, as shown in FIG. 21, to the junction point, at a feed passage station.

Thus, the inclined surface 82 provides a means for directing the fastening element 30, which is discharged from the receptor slot 212, into the second feed opening 88 of the feed passage 84, with the feed passage extending toward a downstream point of the device 38. Further, the air cylinder 226, the coupler 233 and the drive bar 232 provide a means for moving the ram 105 to, and between, the various positions as described herein, including the location whereat the fastening element 30 is discharged from the receptor slot 212.

When the ram 105 is initially assembled with the lower housing member 44, the ledge 196 (FIG. 15) of the ram interfaces, but does not engage, an interfacing portion of the upper surface 66 (FIG. 11) of the lower housing member, adjacent and along the closed channel 160 and the element-discharge end of the feed track 64. In this manner, a clearance space is formed between the ledge 196 and the spaced interfacing portion of the upper surface 66, with a rear wall of the clearance space formed by a contiguous portion of the bottom surface 188a, which is contiguous with the ledge.

When the lead fastening element 30 is initially loaded into the receptor slot 212, a trailing portion of the flange 32 thereof is in engagement with a leading portion of the flange of the second fastening element. During a ram-moving period when the ram 105 is being moved toward the forward wall 180, a forward edge of the leading portion of the flange 32 of the second fastening element 30 is in engagement with the contiguous portion of the bottom surface 188a to prevent the second fastening element from moving from the feed track 64 toward the feed chamber formed by the closed channels 132 and 160.

Figure 22:
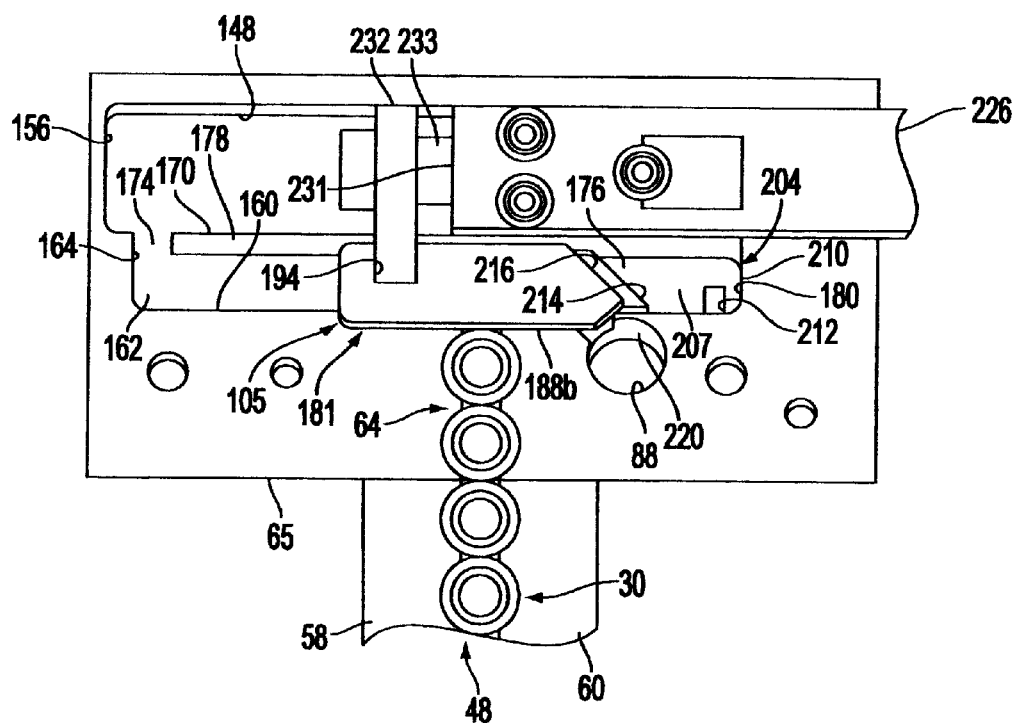
FIG. 22 is a partial top view of the lower housing member of FIG. 10 showing the transfer slide of FIG. 14 in a fully extended position for blocking various passages to preclude the introduction of pressurized media into an enclosed channel of the lower housing member, in accordance with certain principles of the invention.

Referring further to FIG. 21, after the lead fastening element 30 has been discharged from the receptor slot 212 of the ram 105 at the unloading station, and as the lead fastening element is being guided down the inclined surface 88, the drive bar 232 continues to move the ram toward the forward wall 180. Eventually, as shown in FIG. 22, the piston rod 230 has been fully retracted within the cylinder 226, and the coupler 233 is abutting the end 231 of the cylinder. Further, the forward end 210 of the receptor arm 204 engages the forward wall 180 to locate the ram 105 in a prescribed position at a sealing station.

When the ram 105 is in the prescribed position, the first ramped surface 200 of the ram 105 has been moved into engagement with the camming wall 168. In this position, a portion of the bottom surface 188a of the ram 105, which is contiguous with the edge 202 thereof, covers the opening 171 (FIGS. 11 and 20) and blocks any direct communication of the closed channel 160 with the second feed opening 88. At the same time, a portion of the side surface 184 of the ram 105, which is contiguous with the edge 202 of the ram, covers the opening 167 (FIGS. 11 and 19) in the floor 160, which is defined by the upper end of the inclined surface 82. By covering the opening 167, any communication between the closed channel 160 and the second feed opening 88, and over the inclined surface 82, is blocked. In this manner, the closed channel 132 is sealed from any communication with the feed passage 84.

In addition, when the ram 105 is in the prescribed position, the ramped surfaces 214 and 216 of the ram engage the first and second forward walls 140 and 147, respectively, of the upper housing member 42. Also, the arcuate surface 220 of the ram 105 is located within the gap in the wall surface of first feed opening 86 to form a circular continuation of a portion thereof, which extends between the top 145 of the fence 142 and the undersurface 116 at the intersection of the walls 140 and 147 with the first feed opening. Further, the flat surface 224 of the ram 105 is positioned over a portion of the inclined surface 146 of the upper housing member 42, adjacent the first forward wall 140. Still further, a portion of the side surface 182 of the ram 105, which is contiguous with the flat surface 224, covers a portion of the opening of the inclined surface 146, which is contiguous with the ceiling 134 of the upper housing member 42. In this manner, the closed channel 160 is sealed from any communication with the feed passage 84.

Therefore, the feed chamber, as formed by the closed channels 132 and 160, has been sealed from communication with the feed passage 84, as formed by the first and second feed openings 86 and 88, respectively. Thereafter, the pressure medium source 102 is activated to apply the pressure medium to the feed passage 84 to move the lead fastening element 30 in the selected manner described above with respect to FIGS. 4, 5 and 6. Since the feed chamber has been sealed from any communication with the feed passage 84, as described above, the pressurized medium will not enter the feed chamber. This arrangement prevents the pressurized medium from reaching, and disturbing the arrangement of, the remaining serially aligned fastening elements 30 in the feed tracks 48 and 64.

In the operation of the feed device 38, the lead fastening element 30 is always moved over the inclined surface 82 of the lower housing member 44, and into the second feed opening 88. As shown in FIG. 4, the direction of flow of the pressure medium can be selected to urge the fastening element 30 from the junction point downward through the second feed opening 88 and into the second feed tube 98. As shown in FIG. 5, the direction of flow of the pressure medium can be selected to urge the fastening element 30 upward, whereby the element is moved from the junction point in the second feed opening 88 of the lower housing member 44, through the first feed opening 86 of the upper housing member 42, and into the first feed tube 94.

As the pressurized medium is initially applied to move the fastening element 30 upward from the second feed opening 88 and into the first feed opening 86, the fastening element may become wobbly or unstable as the element is moved through the first feed opening. The wobbly movement of the fastening element 30 passing through the first feed opening 86 could possibly result in the element becoming jammed within the first feed opening.

By use and placement of the arcuate surface 220, the flat surface 224, and the inclined surface 146 within the first feed opening 86, movement of the fastening element 30 through the first feed opening is stabilized. In this manner, jamming of the fastening element 30, as the element passes through the first feed opening 86, is precluded.

In general, the above-identified embodiment is not to be construed as limiting the breadth of the present invention. Modifications, and other alternative constructions, will be apparent which are within the spirit and scope of the invention as defined in the appended claims.

What is claimed is:

1. A device for feeding a fastening element, formed with a first end and a second end, toward a downstream point, which comprises:
   a feed track;
   a first feed opening;
   a second feed opening in communication with the first feed opening;
   the first feed opening and the second feed opening forming a feed passage;
   a junction point located within the feed passage;

each of the first and second feed openings extending toward a downstream point;

means for transporting the fastening element from the feed track toward the junction point; and means for arranging the fastening element in a given orientation at the junction point such that the first end of the fastening element is a front end thereof when the fastening element is to be moved through the first feed opening and the second end of the fastening element is a front end thereof when the fastening element is to be moved through the second feed opening.

2. A device according to claim 1, which further comprises:

a feed chamber which extends between the feed track and the junction point.

3. A device according to claim 2, which further comprises:

a surface located between the feed chamber and the junction point and which is inclined downward from the feed chamber to the junction point.

4. A device according to claim 1, wherein the means for transporting comprises:

a movable ram.

5. A device according to claim 4, which further comprises:

a receptor slot formed in the ram; and means for moving the ram into two positions thereof;

wherein, in a first position, the receptor slot is positioned adjacent and aligned with the feed track for receipt of the fastening element therefrom; and in a second position, the ram blocks the feed track.

6. A method for feeding a fastening element, formed with a first end and a second end, toward a downstream point which comprises the steps of:

transporting the fastening element from a feed track to a junction point within a feed passage formed by a first feed opening and a second feed opening which is in communication with the first feed opening; and arranging the fastening element in a given orientation at the junction point such that the first end of the fastening element is a front end thereof when the fastening element is to be moved through the first feed opening and the second end of the fastening element is a front end thereof when the fastening element is to be moved through the second feed opening;

feeding the fastening elements toward a point downstream from the first feed opening and the second feed opening.

7. A method as set forth in claim 6 in which a plurality of fastening elements are transported to the junction point singly.

8. A method as set forth in claim 6 wherein the fastening element is a first fastening element, which further comprises the step of transporting a second fastening element to the junction point, after the first fastening element has been moved from the junction point.

9. A method as set forth in claim 6, wherein the fastening element is transported from the feed track to the junction point through a feed chamber.

10. A method as set forth in claim 9, which further comprises the step of moving the fastening element from the feed chamber over an inclined surface and into the junction point.

11. A method as set forth in claim 6 in which, depending on the desired and selected direction of transport of the fastening element from the junction point toward a downstream point, the first feed opening or the second feed opening can be supplied with a pressure medium, so that the fastening element is transported from the junction point toward the downstream point.

12. A method as set forth in claim 11, which further comprises the step of sealing the feed chamber from the feed passage at least during the application of the pressure medium in the feed passage.

13. A method as set forth in claim 6 in which the fastening element is moved from the feed track toward the junction point by a movable ram.

14. A method set forth in claim 13, which further comprises the step of:

moving the ram between two positions in a feed chamber where, in a first position of the ram, a receptor slot thereof is adjacent the feed track, and in a second position the ram seals any communication between the feed chamber and the feed passage.

* * * * *